(12) United States Patent
Shih

(10) Patent No.: US 6,481,912 B2
(45) Date of Patent: Nov. 19, 2002

(54) PROP CONNECTING RING

(76) Inventor: Lung Ching Shih, No. 64, Chung Tai Road, Taichung (TW)

(*) Notice: Subject to any disclaimer, the term of this patent is extended or adjusted under 35 U.S.C. 154(b) by 29 days.

(21) Appl. No.: 09/819,905

(22) Filed: Mar. 29, 2001

(65) Prior Publication Data

US 2002/0141811 A1 Oct. 3, 2002

(51) Int. Cl.7 .................................................. B66B 7/02
(52) U.S. Cl. ........................... 403/49; 403/344; 24/483; 24/517
(58) Field of Search .......................... 403/49, 344, 373, 403/374.1, 379.4, 290, 256; 24/483, 517

(56) References Cited

U.S. PATENT DOCUMENTS

| | | | | |
|---|---|---|---|---|
| 1,050,816 A | * | 1/1913 | Deslauriers | 24/517 |
| 3,002,241 A | * | 10/1961 | Scurlock | 24/517 |
| 3,376,056 A | * | 4/1968 | Linstead | 24/483 |
| 4,189,810 A | * | 2/1980 | Beziat | 403/49 |
| 4,412,370 A | * | 11/1983 | Speirs | 24/483 |
| 6,406,211 B1 | * | 6/2002 | Hengstenberg et al. | 403/49 |

* cited by examiner

*Primary Examiner*—Lynne H. Browne
*Assistant Examiner*—Kenn Thompson
(74) *Attorney, Agent, or Firm*—Browdy and Neimark, P.L.L.C.

(57) ABSTRACT

Prop connecting ring which is fitted and bound on a construction prop, including: two symmetrical half bodies which are substantially semicircular, an inner face of each half body being formed with a semicircular clamping face, a body of each half body being formed with a predetermined number of insertion holes; rear ends of two half bodies being pivotally connected with each other, whereby the two half bodies can be opened or closed; a first detention hole formed on front end of a first half body; a second detention hole formed on front end of a second half body, when the front ends of the two half bodies are closed, the second detention hole being positioned right under the first detention hole, a rear edge of front end of the second half body being formed with an abutting face positioned at a height lower than the first detention hole; and an insertion fastener which is a wedge bar inserted in the detention holes of the two half bodies for latching the front ends of the two half bodies with each other. When the connecting ring is fitted on the prop, the two clamping faces and the abutting face serve to clamp and bind the prop.

12 Claims, 14 Drawing Sheets

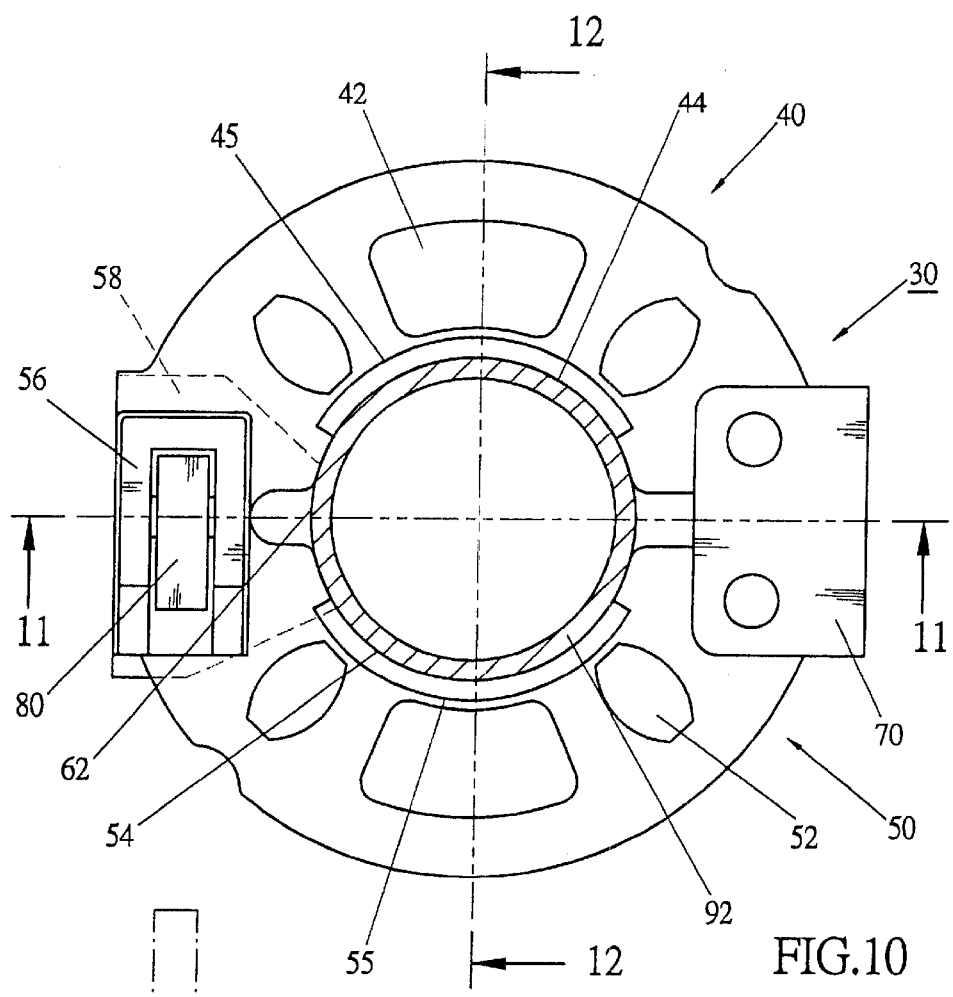
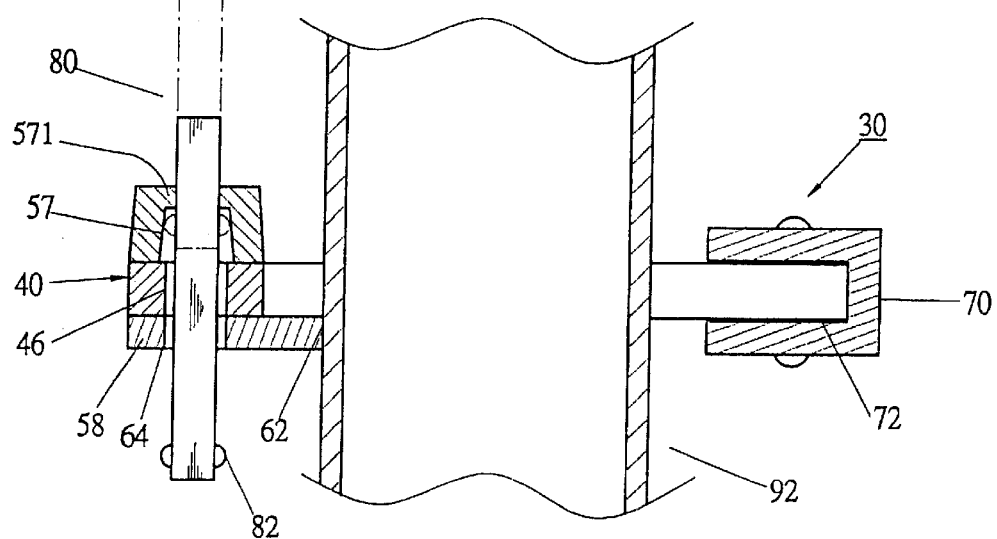
FIG.11

PROP CONNECTING RING

BACKGROUND OF THE INVENTION

The present invention is related to a construction article, and more particularly to a prop connecting ring which is fitted and bound on a construction prop for transversely connecting the props. The connecting ring can be freely mounted on the prop at any necessary height.

FIG. 1 shows a conventional prop 10 used in construction. The prop 10 has an elongated tubular body 11 fixedly connected with multiple ring bodies 12 at equal intervals. The top and bottom ends of the tubular body 11 are respectively provided with two adjustment seats 13. The projecting length of the adjustment seats 13 can be adjusted. Each ring body 12 is formed with multiple through holes 14.

In use, as shown in FIG. 2, the props 10 are positioned upright. Several connecting members 15 are connected at the through holes 14 of the ring bodies 12 to transversely connect two adjacent props. Accordingly, a number of props can be systematically connected to form a truss such as a scaffold for supporting moldboards.

In the case that the ground of a construction site is irregular and the drop of the ground exceeds the maximum extending length of the adjustment seats 13, the ring bodies 12 of the adjacent props 10 will be positioned on different levels as shown in FIG. 2. The distance between the props is fixed so that the connecting members 15 must be adjustable in length for connecting the props. Such adjustable connecting members are relatively expensive. Moreover, it is necessary to adjust the connecting members one by one. Such operation is quite troublesome. Also, in the case that the connecting members 15 have different lengths and the ring bodies 12 are positioned on different levels, the entire scaffold will bear uneven applied force. This leads to safety problem. In addition, The prop 10 is provided with multiple ring bodies 12 for connecting with the connecting member at different height. However, when transversely connecting the props, not all the ring bodies 12 are used. Therefore, many ring bodies are wasted and the cost is increased.

FIG. 3 shows another type of steel prop 19 for supporting moldboards. The inner tube 191 of such prop 19 can be nested into the outer tube 192 to adjust the length to a greater extent. However, such prop is not equipped with any ring body so that it can be only solely used in an upright state and it is impossible to transversely connect the adjacent props. Therefore, the props cannot be interconnected to form a systematic truss.

Recently, a connecting ring has been developed as shown in FIG. 4. The connecting ring 20 has a semicircular body 22 and a straight lever body 24 pivotally connected with the semicircular body 22 at one end, whereby the semicircular body 22 can be opened or closed relative to the lever body 24. A wedge binding bar 26 is passed through a free end of the semicircular body 22. In use, as shown in FIG. 5, the free end of the semicircular body 22 is passed through the other end of the lever body 24. Then, the connecting ring 20 is fitted around a prop 28. Then, the binding bar 26 is moved downward to fasten the semicircular body 22 and the lever body 24 on the prop 28. Accordingly, connecting members 29 can be connected at the through holes 23 of the semicircular body 22 to transversely connect the prop 28 with an adjacent prop.

However, such connecting ring 20 has some shortcomings as follows: First, as shown in FIG. 5, sections A and B of the connecting ring are fitted around the prop 28. The contacting area is limited so that the binding strength is poor and the connecting ring can hardly bear greater applied force. Furthermore, only a half side, that is, the left side in FIG. 5 of the connecting ring is formed with through holes 23 for connecting with the connecting member 29. The other side of the prop cannot be transversely connected with another prop. Therefore, in use, only four props 28 can be interconnected to form a rectangular truss, while it is impossible to systematically connect multiple props into a scaffold. Furthermore, the pivot ends of the semicircular body 22 and the lever body 24 tend to loosen so that the two components 22, 24 are likely to up and down swing due to the gap. As a result, the binding force for the prop is poor.

SUMMARY OF THE INVENTION

It is therefore a primary object of the present invention to provide a prop connecting ring which can be freely fitted on the prop at any necessary height. Therefore, the ring bodies of two adjacent props can be positioned on the same level to facilitate connection of the props.

It is a further object of the present invention to provide the above prop connecting ring. With the prop connecting ring, it is no more necessary to weld connecting rings on the prop at equal intervals so that the number of the connecting rings can be reduced.

It is still a further object of the present invention to provide the above prop connecting ring which serves to transversely connect steel props.

It is still a further object of the present invention to provide the above prop connecting ring which has better clamping and binding force.

It is still a further object of the present invention to provide the above prop connecting ring which enables the props to be multidirectionally connected to form a systematic scaffold.

It is still a further object of the present invention to provide the above prop connecting ring by which the systematic scaffold has better supporting strength.

The present invention can be best understood through the following description and accompanying drawings wherein:

BRIEF DESCRIPTION OF THE DRAWINGS

FIG. 10 is a sectional view taken along line 10—10 of FIG. 9, showing that the connecting ring clamps the outer tube of the steel prop;

FIG. 11 is a sectional view taken along line 11—11 of FIG. 10;

DETAILED DESCRIPTION OF THE PREFERRED EMBODIMENTS

Figure 6:
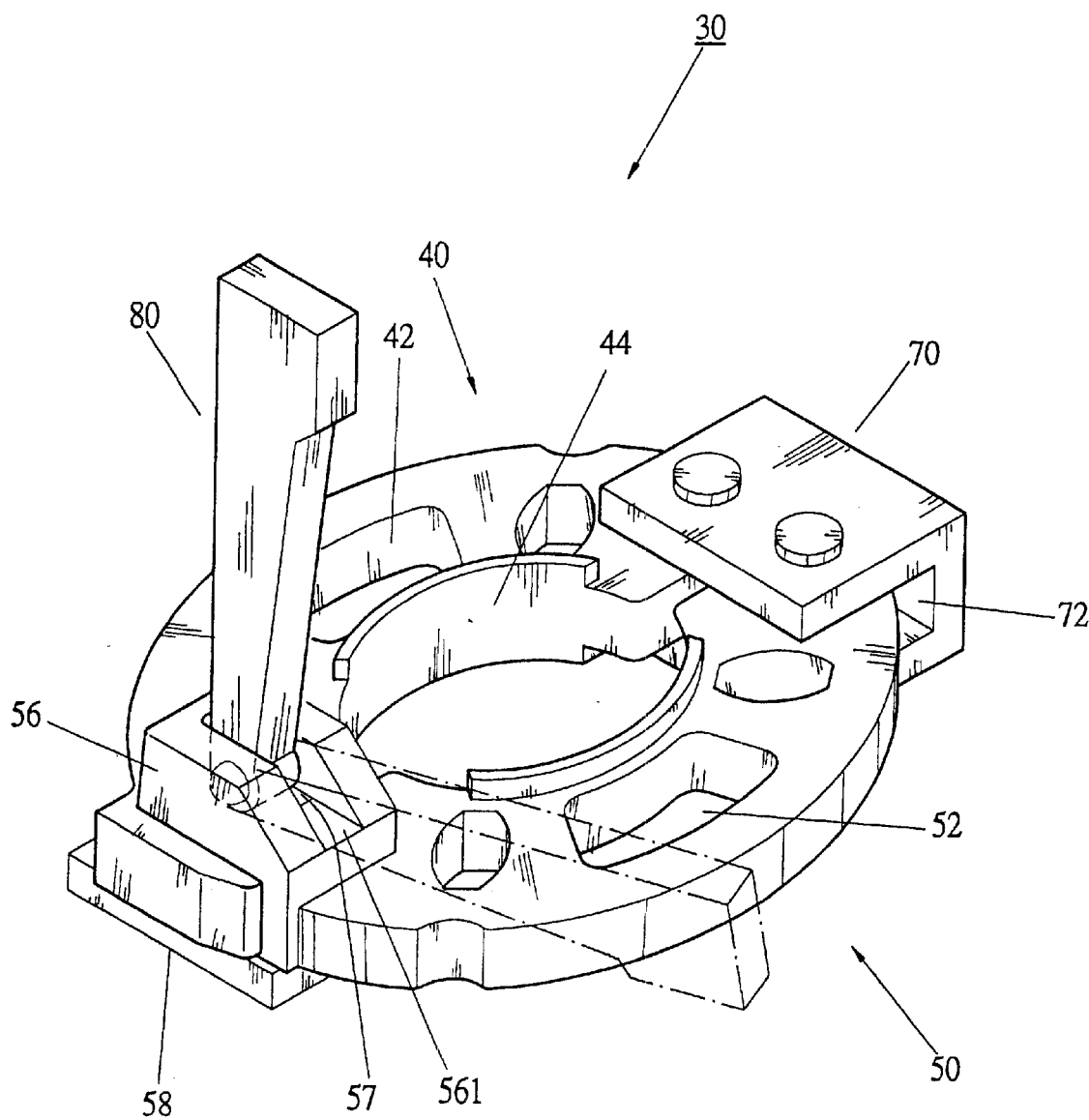
FIG. 6 is a perspective assembled view of a preferred embodiment of the present invention.
Figure 7:
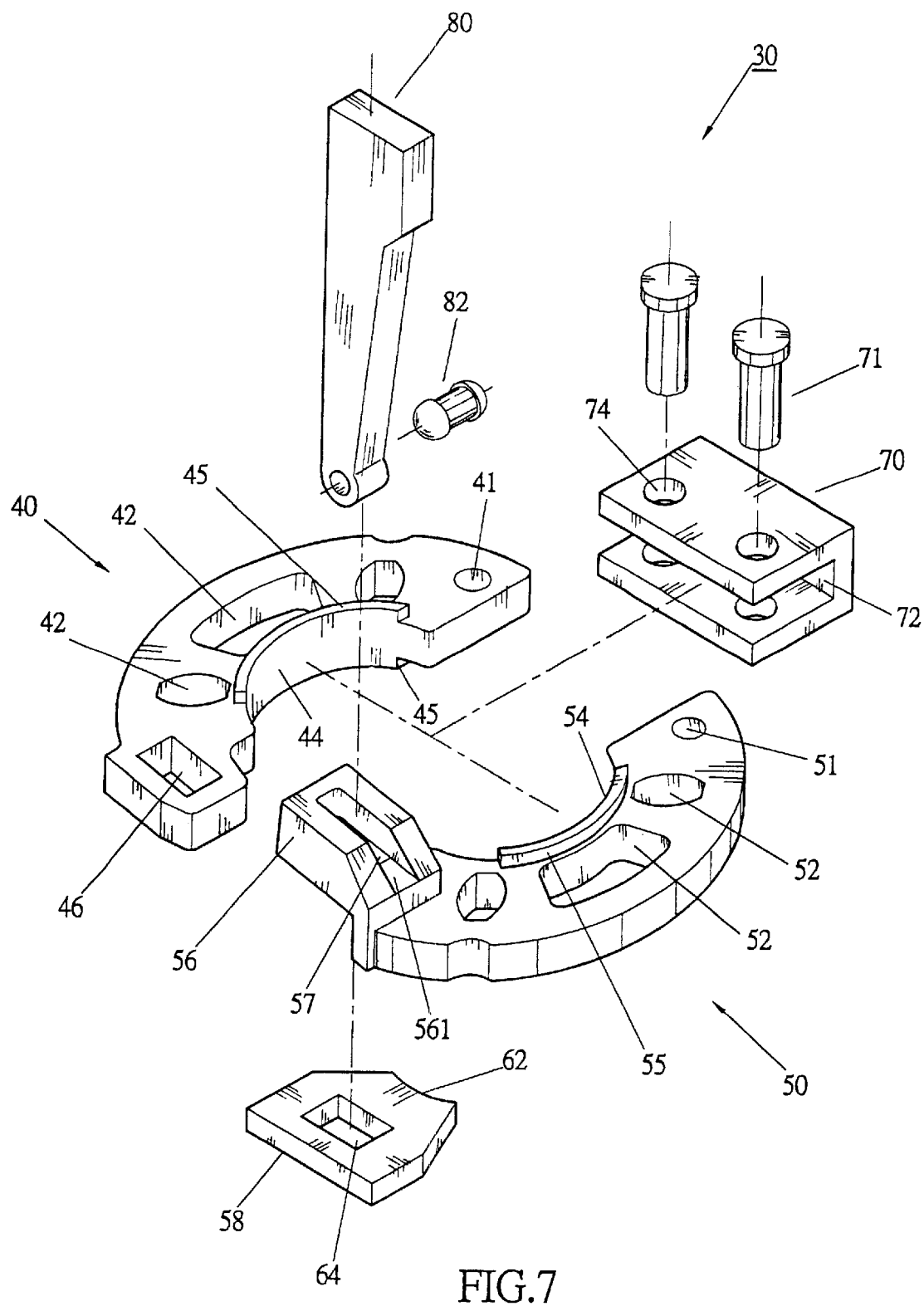
FIG. 7 is a perspective exploded view according to FIG. 6.

Please refer to FIGS. 6 and 7. According to a preferred embodiment, the prop connecting ring 30 of the present invention includes a left half body 40 and a right half body 50 pivotally connected with each other at one end. The other ends of the two half bodies are latched together by an insertion fastener 80.

The left half body 40 is a substantially semicircular plate body formed with several insertion holes 42. The inner face of the left half body 40 is a semicircular clamping face 44. The top and bottom edges of the clamping face 44 are respectively formed with two outward extending arch lip sections 45. Therefore, the clamping face 44 has a thickness larger than the thickness of the wall of the left half body 40 so as to enlarge contacting area. In addition, the front end of the left half body 40 is formed with a detention hole 46 and the rear end thereof is formed with a pivot hole 41.

The right half body 50 is also substantially semicircular plate body substantially symmetrical to the left half body 40. The body of the right half body 50 is formed with several insertion holes 52. The inner face of the right half body 50 is a semicircular clamping face 54. The top and bottom edges of the clamping face 54 are respectively formed with two outward extending arch lip sections 55. The top face of front end of the right half body 50 is provided with a projecting section 56 extending toward the left half body 40. The projecting section 56 is positioned at a height higher than the body of the right half body. The projecting section is formed with an upper detention hole 57. A clamping plate 58 is fixed under the front end of the right half body 40 and positioned at a height lower than the body of the right half body. The clamping plate 58 is right positioned under the projecting section 56 and spaced therefrom a certain distance to define an insertion space 60. The inner edge of the clamping plate 58 is formed with an arch abutting face 62. The abutting face 62 and the clamping, face 54 are co-arched as shown in FIG. 10. The clamping plate 58 is formed with a lower detention hole 64 aligned with the upper detention hole 57 of the projecting section.

The rear ends of the left and right half bodies 40, 50 are received in a fissure 72 of a chuck member 70. Two shaft pins 71 are passed through the through holes 74 of the chuck member 70 and the pivot holes 41, 51 of rear ends of the left and right half bodies 40, 50 to pivotally connect the left and right half bodies 40, 50 with the chuck member. Therefore, the left and right half bodies 40, 50 can swing about the shaft pins 71 into an opened or a closed state. The front end of the left half body 40 can extend into the insertion space 60 of front end of the right half body with the two clamping faces 44, 54 opposite to each other.

Figure 9:
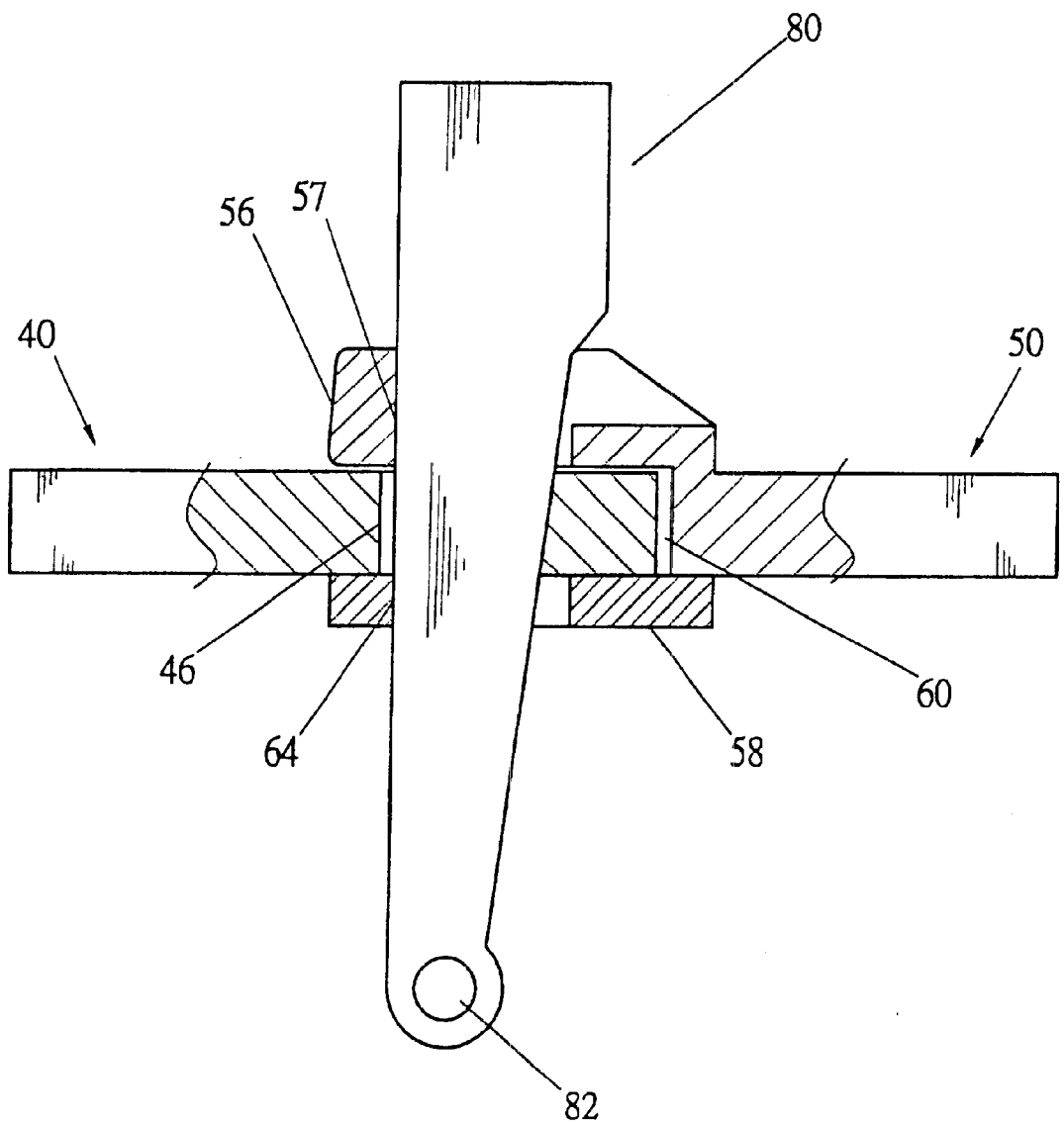
FIG. 9 is a sectional view according to FIG. 8, showing that the front ends of the two half bodies are latched with each other.

The insertion fastener 80 is a flat wedge bar with narrower bottom end and wider top end. The insertion fastener 80 has a downward tapered body. The bottom end of the insertion fastener 80 is passed through the upper detention hole 57 of the projecting section 56 and the detention hole 46 of the left half body 40 and the lower detention hole 64 of the clamping plate 58 as shown in FIG. 9, whereby the two half bodies 40, 50 are latched with each other. The insertion fastener 80, the three detention holes and the abutting face 62 are positioned right in the middle line between the two half bodies (line 11—11 of FIG. 10).

Figure 3:
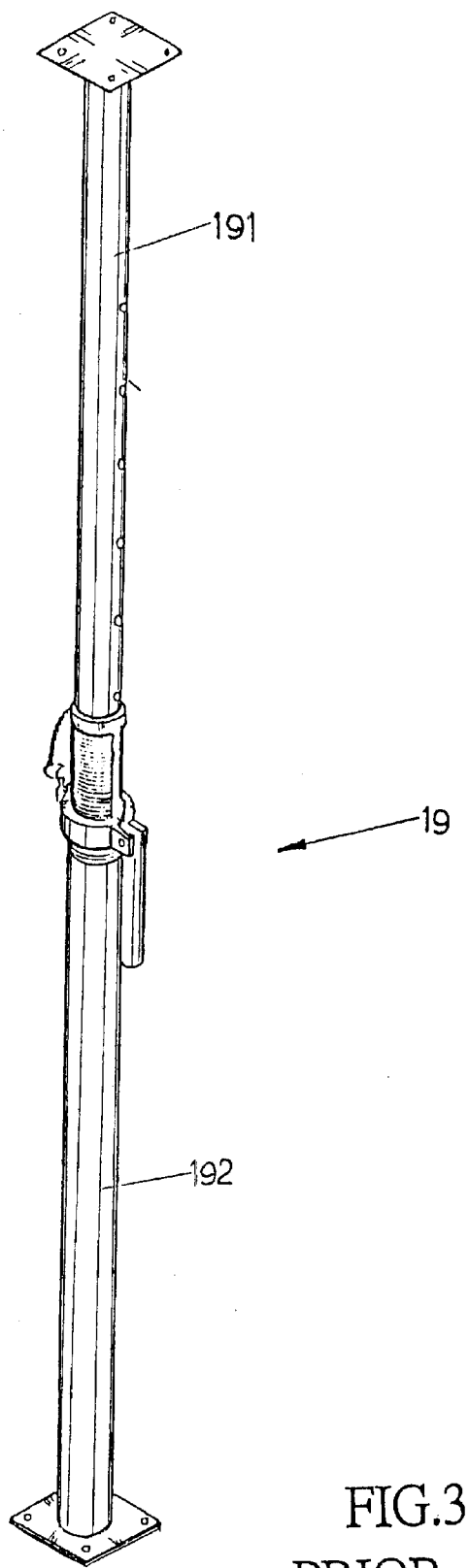
FIG. 3 shows another type of conventional steel prop.
Figure 8:
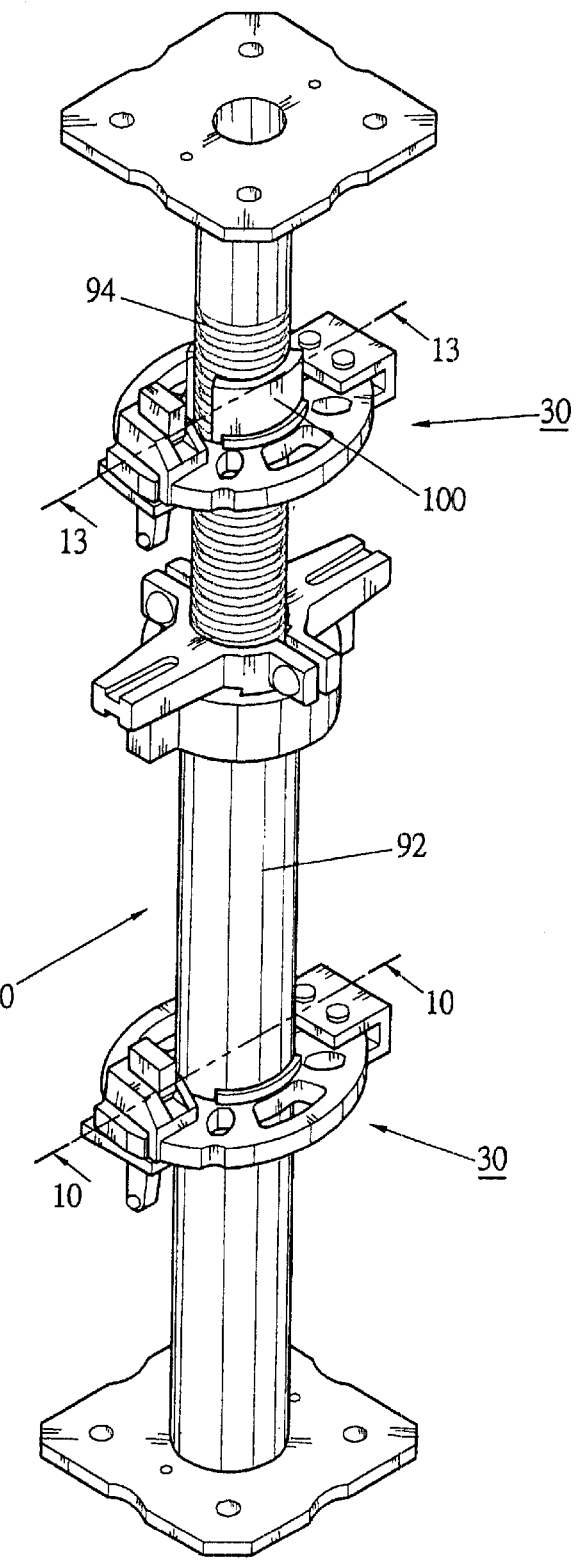
FIG. 8 is a perspective view showing that the connecting ring of the present invention is fitted around a steel prop.
Figure 12:
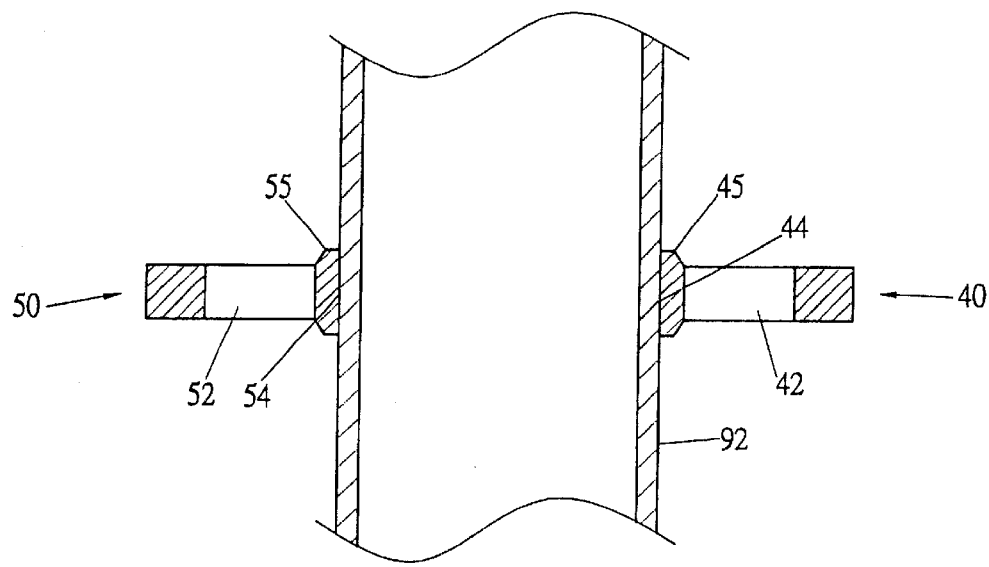
FIG. 12 is a sectional view taken along line 12—12 of FIG. 10.
Figure 13:
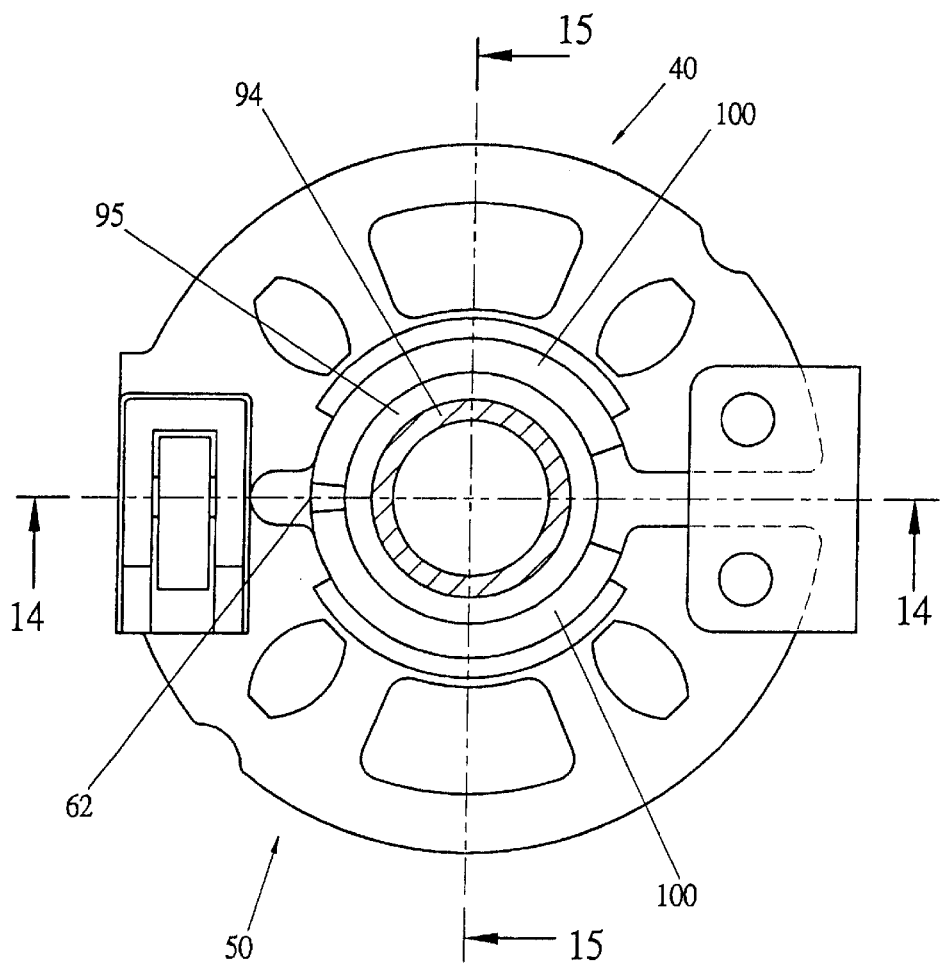
FIG. 13 is a sectional view taken along line 13—13 of FIG. 9, showing that the connecting ring clamps the inner tube of the steel prop.
Figure 14:
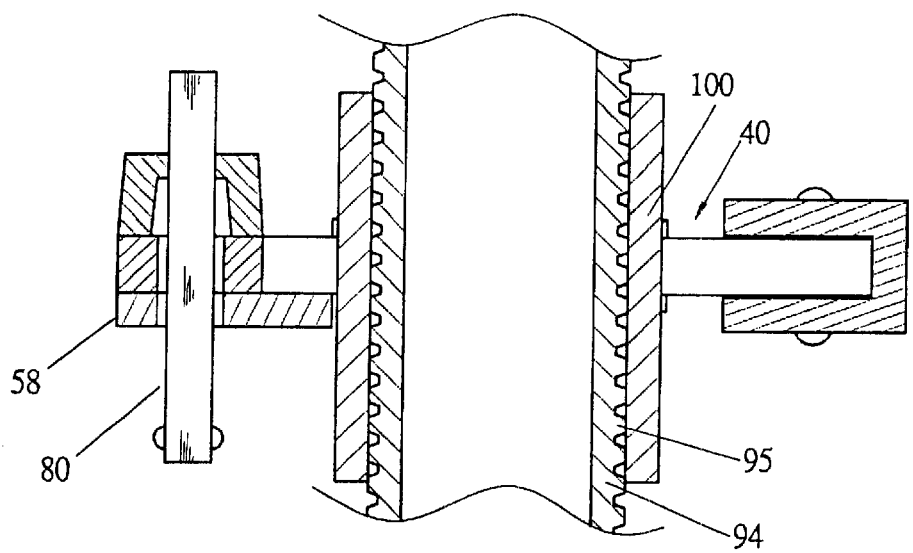
FIG. 14 is a sectional view taken along line 14—14 of FIG. 10.
Figure 15:
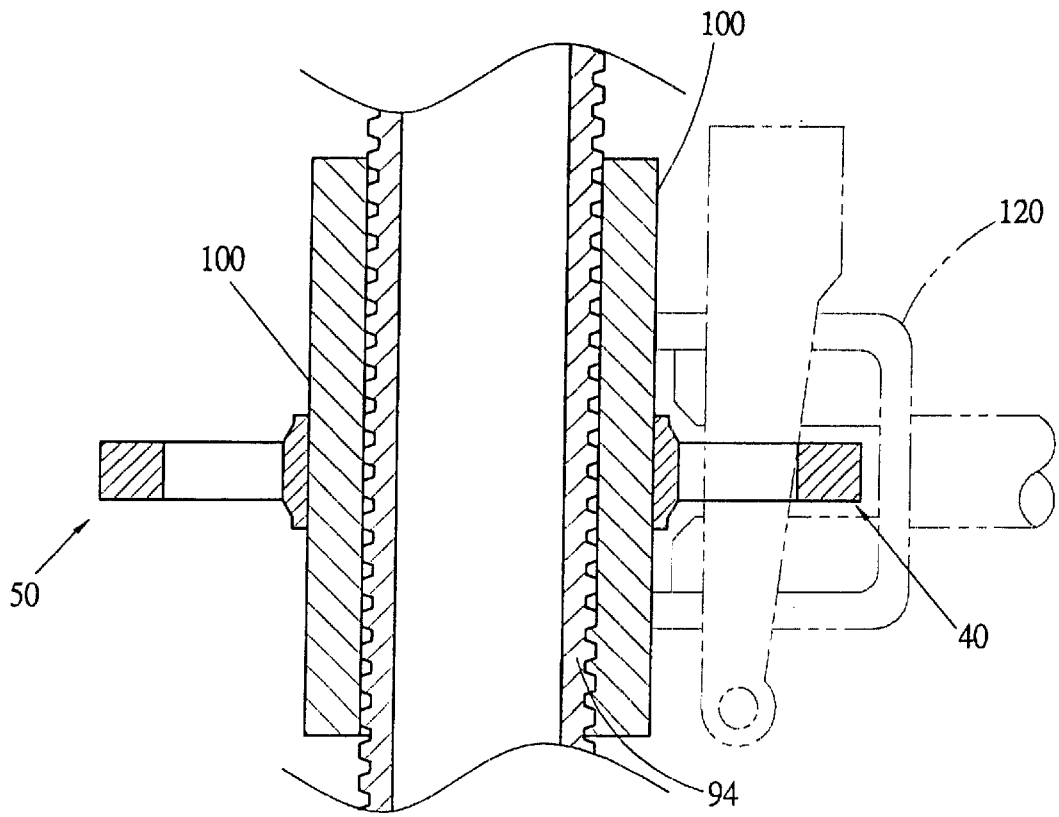
FIG. 15 is a sectional view taken along line 15—15 of FIG. 10.

In use, as shown in FIG. 8, with the steel prop produced by the applicant exemplified, the steel prop 90 as shown in FIG. 3 is not equipped with any connecting ring. An operator can fit several connecting rings 30 onto the inner and outer tubes 92, 94 of the steel prop 90. When fitted, the two half bodies 40, 50 are first opened to fit onto the prop 90. Then, the front ends of the two half bodies are closed to make the front end of the left half body 40 extend into the insertion space 60 of the front end of the right half body 50 as shown in FIG. 9. Accordingly, the clamping faces 44, 54 and the abutting face 62 together clamp the outer circumference of the outer tube as shown in FIGS. 10 and 11. Then the insertion fastener 80 is downward knocked to thrust into the three detention holes 57, 46, 64. As shown in FIG. 9, two lateral faces of the insertion fastener 80 are tightly engaged with the inner wall faces of the three detention holes 57, 46, 64 so that the front ends of the two half bodies 40, 50 are tightly latched with each other. At the same time, the clamping faces 44,54 and the abutting face 62 together tightly clamp and engage with the outer circumference of the outer tube 92 as shown in FIGS. 10 to 12. Under such circumstance, the connecting ring 30 is tightly fitted around the prop 90.

In addition, with the a butting face 62 abutting against the wall of the prop, when the operator downward knocks the insertion fastener 80, the knocked portion (that is, the front end) of the connecting ring 30 will not sink. Therefore, when knocking the insertion fastener, the connecting ring can keep horizontal without being inclined. Therefore, the clamping faces 44, 54 of the two half bodies 40, 50 can be effectively fastened at a minimum gap so as to truly bind the prop.

FIGS. 10 to 12 show that the connecting ring 30 is fitted around the outer tube 92 of the steel prop 90. With respect to the inner tube 94 of the steel prop 90 with smaller diameter, there are two ways to binding the inner tube. One is to fit a connecting ring with smaller diameter onto the inner tube. The other is to respectively weld two clamping members 100 on inner faces of the left and right half bodies 40, 50 of a connecting ring with the same diameter. The clamping member 100 has a substantially semicircular cross-section as shown in FIGS. 8 and 13 to 15. Such measure can reduce the inner diameter of the ring body for snugly fitting the connecting ring 30 onto the inner tube 94. It can be known from FIGS. 13 to 15 that the inner wall faces of the two clamping members 100 clamp and bind the inner tube 94 without damaging the thread 95 thereof. In addition, the clamping members 100 clamp the inner tube 94 by large area so as to achieve a firm binding effect.

When detaching the connecting ring 30, the insertion fastener 80 is upward knocked from a state of FIG. 9. After the insertion fastener 80 is separated from the detention hole 46 of the left half body 40, the front ends of the two half bodies 40, 50 are unlatched from each other. At this time, the two half bodies 40, 50 can be opened and taken off from the steel prop.

When moving the insertion fastener 80 upward, the rivet 82 at the bottom end thereof is stopped by a shoulder section 571 formed on top edge of the detention hole 57 as shown by phantom line of FIG. 11. Therefore, the insertion fastener 80 is prevented from detaching from the connecting ring 30. When stored, the top end of the insertion fastener 80 is tilted down into a horizontal state as shown by phantom line of FIG. 6, whereby the insertion fastener 80 is received in a recess 561 formed on one side of the projecting section 56 to minimize the volume.

Figure 1:
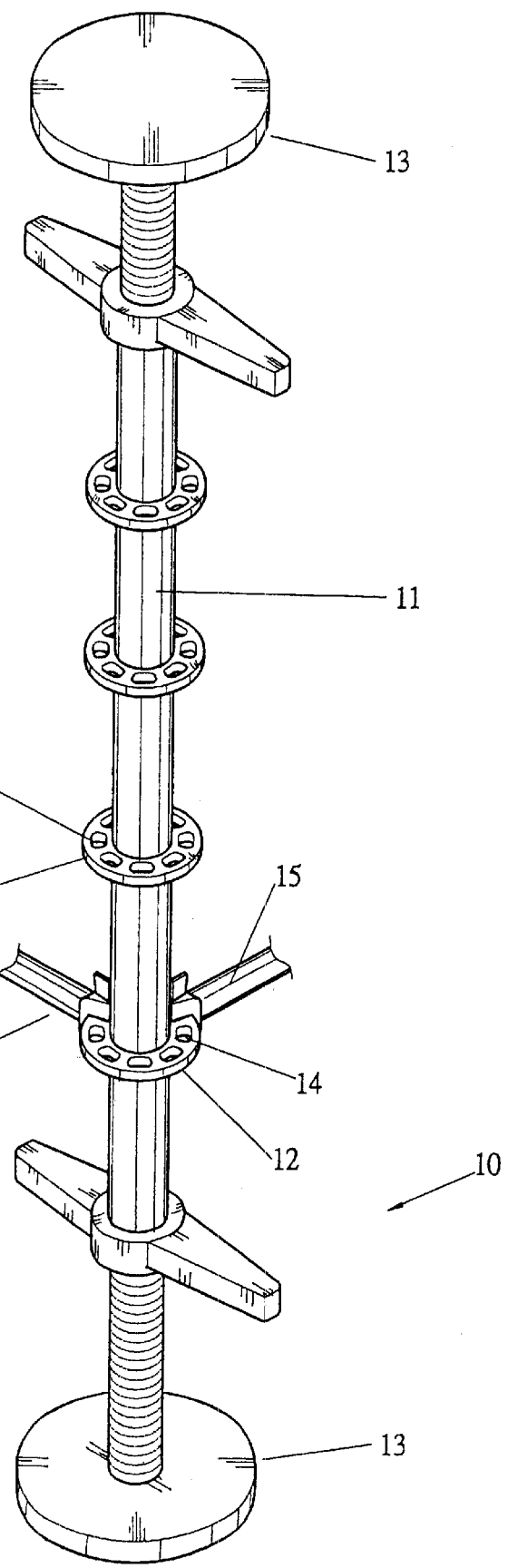
FIG. 1 is a perspective view of a conventional prop.
Figure 2:
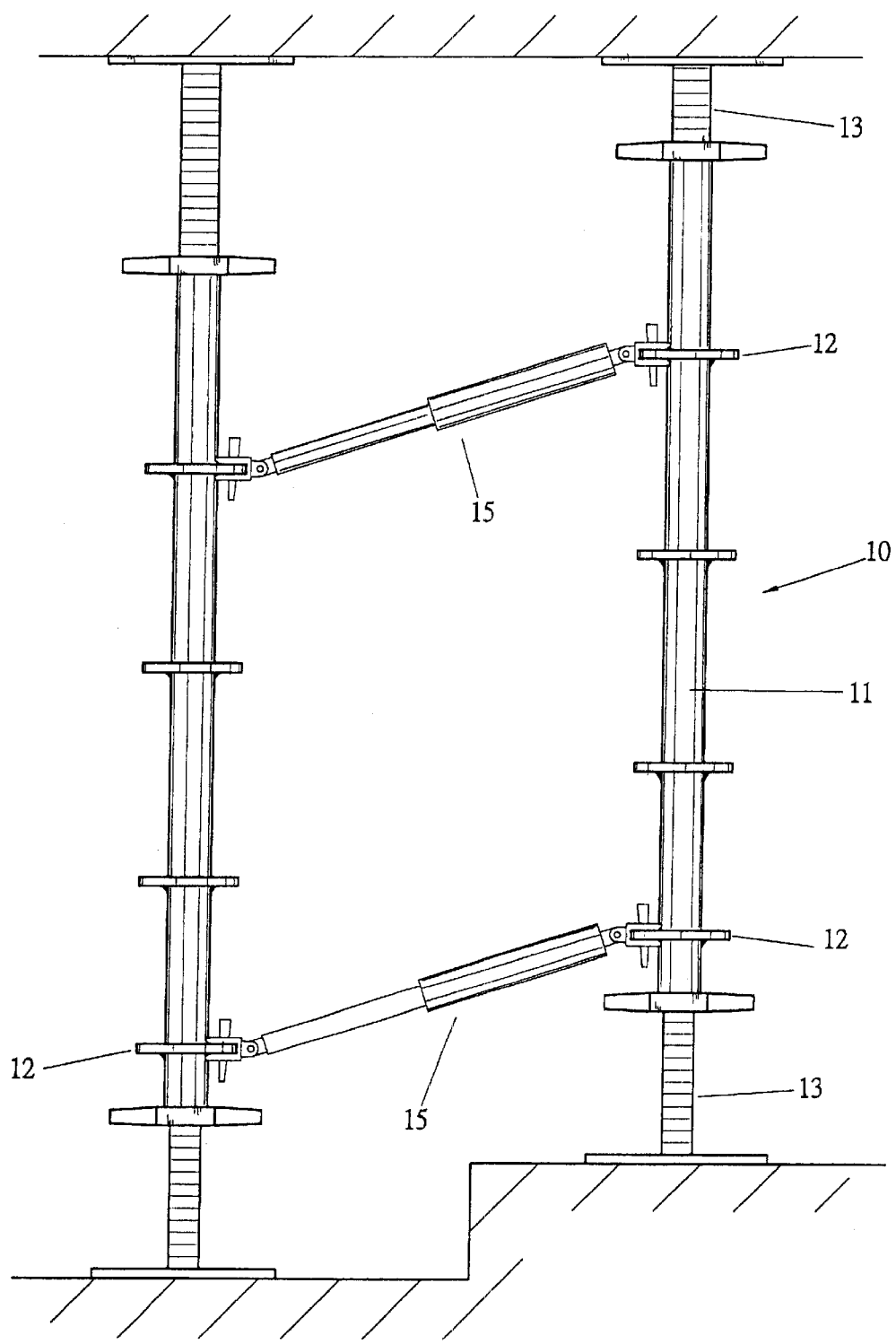
FIG. 2 shows the use of the prop of FIG. 1.
Figure 16:
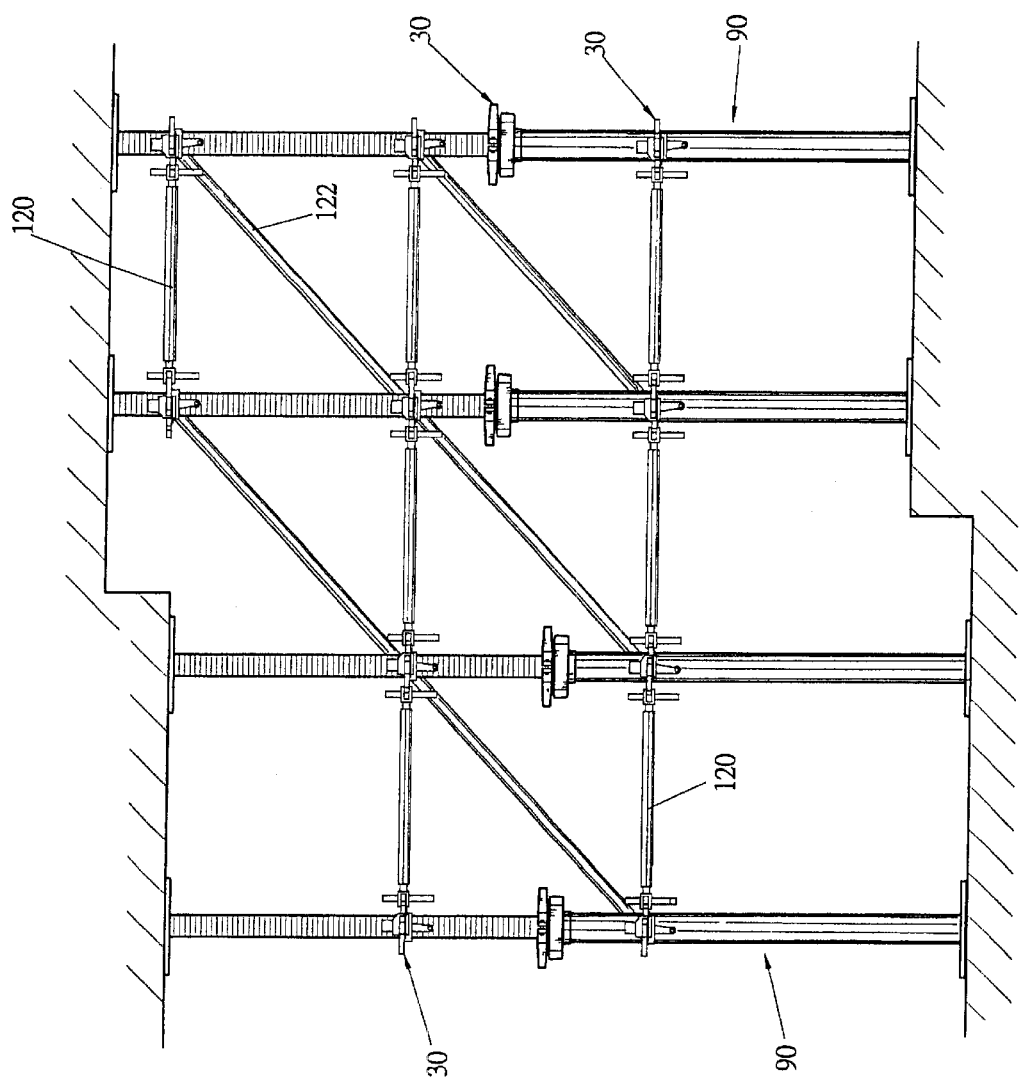
FIG. 16 shows the use of the connecting ring of the present invention in one state.

The present invention has the following advantages:

1. The connecting ring of the present invention is detachably fitted around the prop which can be a conventional prop as shown in FIG. 1 for forming the scaffold or a steel prop 90 as shown in FIG. 3 or 8. Therefore, the application field of the connecting ring is wider. In addition, as shown in FIG. 16, in the case that the ground of the working site is irregular, the worker can mount the connecting rings 30 on the props 90 at the same height for easily transversely connecting the connecting members 120 with the connecting rings 30. With the connecting rings 30 positioned at the same height, the connecting members 120 with fixed length can be transversely connected. This lowers the cost for the connecting members 120. With fixed length of the connecting members and same height of the connecting rings 30, the props 90 are transversely connected at greatest strength. Therefore, the scaffold formed thereby can have higher load strength.

Figure 4:
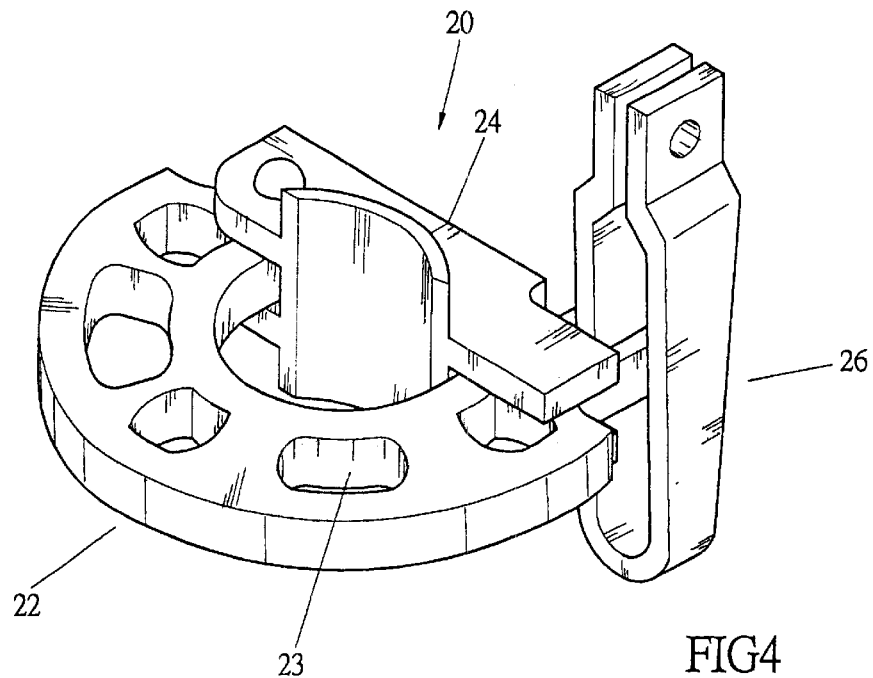
FIG. 4 is a perspective view of a conventional connecting ring.
Figure 5:
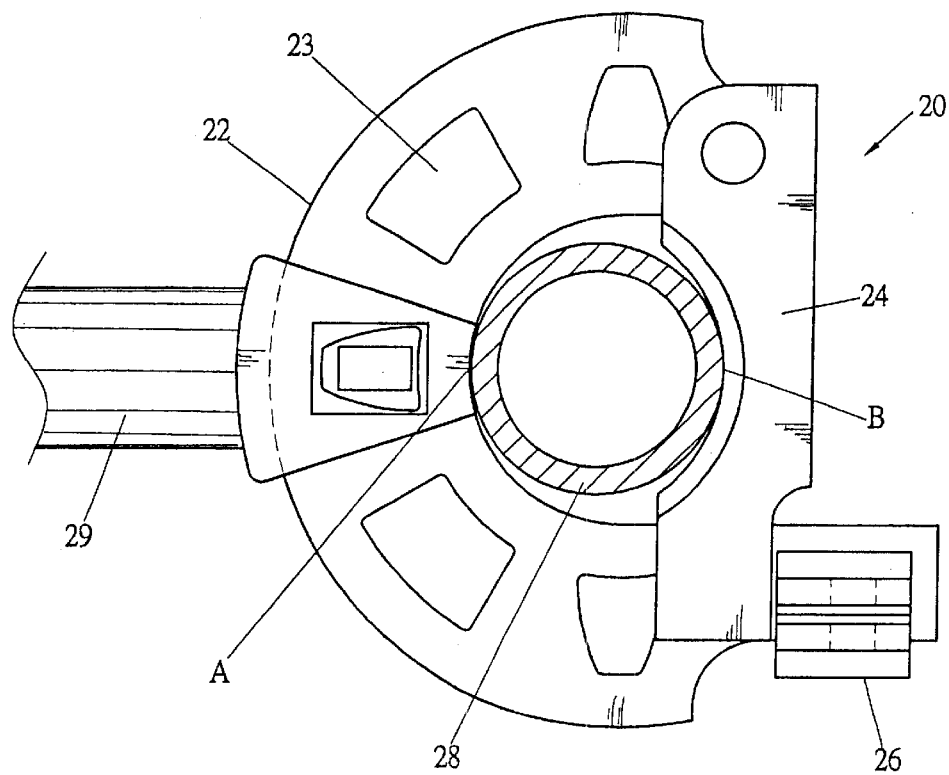
FIG. 5 is a top view according to FIG. 4, showing the use of the connecting ring.

2. The left and right half bodies of the connecting ring both have insertion holes. Therefore, after fitted around the prop, insertion holes are provided along the entire circumference of the prop for connecting with the connecting members 120. Therefore, as shown in FIG. 16, multiple props 90 can be transversely connected. In contrast to the conventional structure of FIGS. 4 and 5, the present invention can more effectively transversely connect the props to enhance the stability thereof. Also, the props can be further diagonally connected by inclined members 122 to enhance the stability of the scaffold.

3. The connecting ring of the present invention has three clamping sections for clamping the prop. The contacting area is larger so that better binding strength is achieved.

4. In use of the connecting ring of the present invention, the connecting ring is fitted around the prop at a certain height in accordance with the length of the prop. The height of the connecting ring is variable. Moreover, it is unnecessary to mount multiple connecting rings on the prop so that the cost therefore is reduced.

5. As shown in FIG. 11, the two half bodies 40, 50 are restricted within the fissure 72 of the chuck member 70. Therefore, the gap between the two half bodies is eliminated and the two half bodies are kept on the same level. Therefore, when opening or closing the two half bodies, the two half bodies are prevented from swinging up and down and an optimal binding force can be achieved. In addition, the insertion structure at front ends of the two half bodies helps in keeping the two half bodies on the same level and reducing the vertical swinging thereof.

Figure 17:
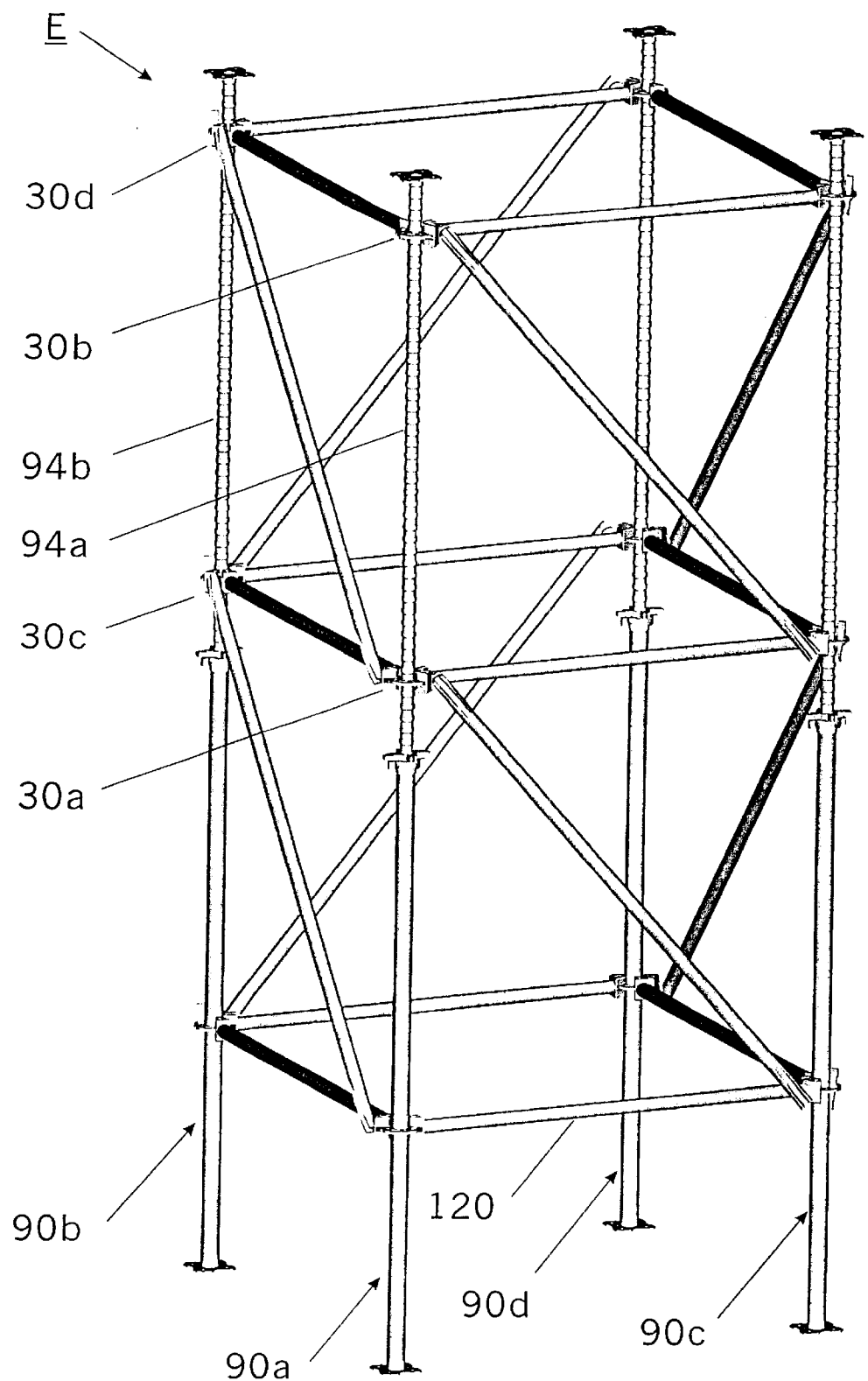
FIG. 17 shows a truss composed of the steel props of FIG. 8 and the connecting rings of the present invention.
Figure 18:
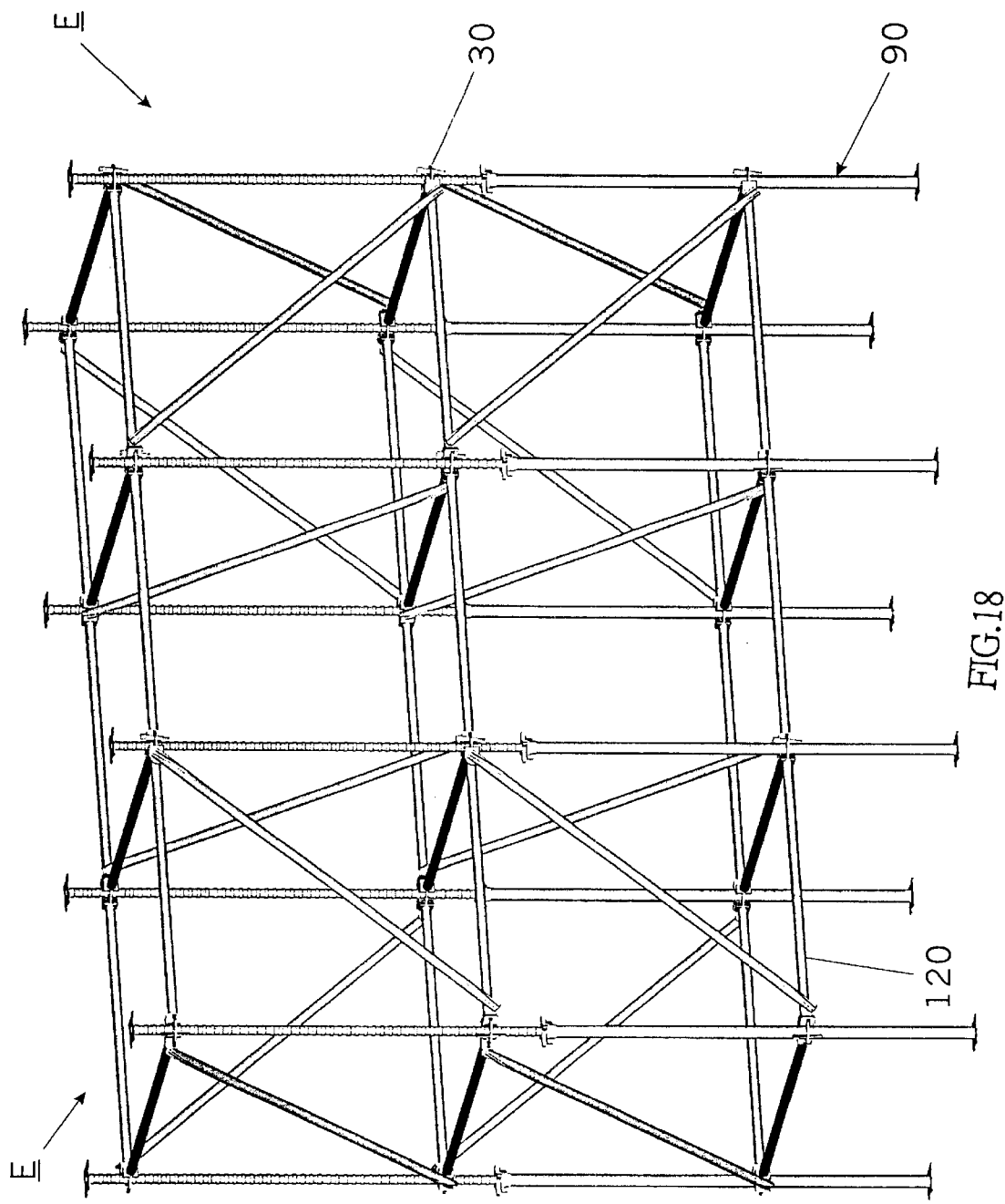
FIG. 18 shows a systematic scaffold composed of the trusses of FIG. 17.

6. The connecting ring of the present invention enables the props to be multidirectionally connected. Therefore, a number of steel props as shown in FIG. 8 can be connected to form a systematic truss serving as a scaffold. FIG. 17 shows a rectangular truss unit E of the scaffold. When assembled, the units can be latitudinally and longitudinally extensively connected to form a big solid systematic scaffold as shown in FIG. 18. When assembled in a working site, the respective units E are first assembled on the ground. Then, the units are craned to suitable positions by a crane and then further assembled in sequence. Such operation greatly shortens the time for assembling the scaffold at a high place so that the operation efficiency can be promoted.

In addition, the units can be respectively adjusted in height. For example, the connecting rings 30a, 30b on the prop 90a can be released for adjusting the height of the inner tube 94a. After adjusted to a necessary height, the two connecting rings 30a, 30b are again fitted and tightened. Then, the height of another prop 90b can be adjusted. The connecting rings 30c, 30d on the prop 90b are released for adjusting the height of the inner tube 94b. After adjusted to a necessary height, the two connecting rings 30c, 30d are again fitted and tightened. Accordingly, the remaining steel props 90c, 90d can be adjusted in height so as to adjust the height of the entire systematic scaffold without disassembling the units E. Such operation can be conveniently performed.

It should be also noted that in the connecting ring of the present invention, the right half body is provided with a lower clamping plate on which the front end of the left half body is overlaid. Such arrangement can be modified. For example, the clamping plate can be at the same height as the body of the right half body and the front end of the left half body can be at a height higher than the body of the left half body. Accordingly, when the front ends of the two half bodies are closed, the front end of the left half body is still overlaid on the front end of the right half body.

The above embodiments are only used to illustrate the present invention, not intended to limit the scope thereof. Many modifications of the above embodiments can be made without departing from the spirit of the present invention.

What is claimed is:

1. Prop connecting ring fitted and bound on a construction prop, comprising:

a first half body which is a substantially semicircular plate body, an inner face of the first half body being formed with a semicircular clamping face, a body of the first half body being formed with a predetermined number of insertion holes;

a second half body which is a substantially semicircular plate body opposite to the first half body, an inner face of the second half body being formed with a semicircular clamping face, a body of the second half body being formed with a predetermined number of insertion holes, rear ends of two half bodies being pivotally connected with each other, whereby the two half bodies can be pivotally rotated about the pivot sections and opened or closed, the clamping faces of the two half bodies being opposite to each other for clamping the prop;

a first detention hole formed on the front end of the first half body, a second detention hole being formed on the front end of the second half body, when the front ends of the two half bodies are closed, the two detention holes being positioned on different levels and aligned with each other with the second detention hole positioned under the first detention hole, a rear edge of front end of the second half body being formed with an abutting face, the abutting face being positioned at a height lower than that of the first detention hole; and an insertion fastener which is a wedge bar with a narrower end and a wider end, the insertion fastener being inserted into the detention holes of the two half bodies for latching the front ends of the two half bodies with each other, whereby when the connecting ring is fitted on the prop, the two clamping faces and the abutting face serve to clamp and bind the prop.

2. Prop connecting ring as claimed in claim 1, wherein the bottom edge of front end of the second half body is provided with a clamping plate which is positioned at a height lower than that of the body of the second half body, rear end of the clamping plate forming the abutting face, the second detention hole being formed on the clamping plate.

3. Prop connecting ring as claimed in claim 2, wherein a top face of front end of the second half body is provided with a projecting section extending toward the first half body, the projecting section being positioned at a height higher than that of the body of the second half body, the projecting section being formed with a third detention hole, the clamping plate being right under the projecting section, the second detention hole being positioned right under the third detention hole, the projecting section and the clamping plate defining therebetween an insertion space in which the front end of the first half body is inserted, the three detention holes being vertically aligned with each other, the insertion fastener being passed through and inserted into the three detention holes.

4. Prop connecting ring as claimed in claim 1, wherein the front end of the first half body is positioned at a height higher than that of the body of the first half body.

5. Prop connecting ring as claimed in claim 1, wherein top and bottom edges of the clamping face of each of the half bodies are respectively formed with two lip sections respectively upward and downward extending.

6. Prop connecting ring as claimed in claim 1, further comprising two clamping members which are elongated bodies each having a substantially semicircular cross-section, outer faces of the clamping members being respectively fixedly connected with the inner faces of the two half bodies, the two clamping members serving to clamp and bind the prop.

7. Prop connecting ring as claimed in claim 3, wherein a top edge of the third detention hole of the projecting section is formed with a shoulder section with smaller inner diameter, the bottom end of the insertion fastener being the narrower end and provided with a rivet, whereby when the insertion fastener is moved upward, the rivet is stopped by the shoulder section to prevent the insertion fastener from detaching from the detention hole.

8. Prop connecting ring as claimed in claim 7, wherein one side of the projecting section distal from the first half body is formed with a recess in which the insertion fastener can be horizontally received.

9. Prop connecting ring as claimed in claim 1, wherein the insertion fastener, the two detention holes and the abutting face are positioned in a middle line between the two half bodies.

10. Prop connecting ring as claimed in claim 1, further comprising a chuck member, rear ends of the two half bodies being pivotally connected with the chuck member.

11. Prop connecting ring as claimed in claim 10, wherein the chuck member has a U-shaped cross-section and is formed with a fissure in which the rear ends of the two half bodies are pivotally connected.

12. Prop connecting ring as claimed in claim 1, wherein the abutting face is an arch face, the abutting face and the clamping face of the second half body being co-arched.

* * * * *